United States Patent
Nangle

(10) Patent No.: US 8,248,324 B2
(45) Date of Patent: Aug. 21, 2012

(54) DISPLAY WITH REPLICA WELDING HELMET VIEWER

(75) Inventor: David J. Nangle, Loveland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 879 days.

(21) Appl. No.: 11/952,433

(22) Filed: Dec. 7, 2007

(65) Prior Publication Data

US 2009/0109128 A1    Apr. 30, 2009

Related U.S. Application Data

(60) Provisional application No. 60/982,223, filed on Oct. 24, 2007.

(51) Int. Cl.
| G09G 5/00 | (2006.01) |
| A61F 9/06 | (2006.01) |
| G09B 19/00 | (2006.01) |
| G03H 1/00 | (2006.01) |
| G02F 1/1335 | (2006.01) |

(52) U.S. Cl. ............... 345/8; 2/8.2; 434/219; 434/234; 359/13; 345/7; 345/905; 345/9; 349/13

(58) Field of Classification Search ............... 345/7–9, 345/905; 219/50, 121.11, 130.01; 359/13, 359/630; 349/11–14; 348/53; 2/8.2
See application file for complete search history.

(56) References Cited

U.S. PATENT DOCUMENTS

| 4,132,014 A | | 1/1979 | Schow | |
| 4,523,808 A | * | 6/1985 | Miller et al. | 359/481 |
| 4,931,018 A | * | 6/1990 | Herbst et al. | 434/234 |
| 5,320,538 A | * | 6/1994 | Baum | 434/307 R |
| 5,734,421 A | * | 3/1998 | Maguire, Jr. | 348/121 |
| 5,896,579 A | * | 4/1999 | Johnson et al. | 2/8.6 |
| 6,230,327 B1 | * | 5/2001 | Briand et al. | 2/8.1 |
| 6,871,958 B2 | * | 3/2005 | Streid et al. | 353/37 |
| 7,346,972 B2 | * | 3/2008 | Inget et al. | 29/527.1 |

FOREIGN PATENT DOCUMENTS

| EP | 0963744 A1 | 6/1999 |
| FR | 2827066 A1 | 7/2001 |
| WO | WO 01/58399 | 8/2001 |
| WO | WO 2009/053829 | 4/2009 |

OTHER PUBLICATIONS

International Search report dated Jun. 23, 2009.
Intl. Preliminary Report on Patentability for counterpart Intl. App. PCT/IB2008/002840 (WO2009053829); Report & Annexes, 9 pgs.; (Jan. 20, 2010).
Written Opinion for Intl. App. PCT/IB2008/002840 (WO2009053829); 5 pgs.; (posted Apr. 24, 2010 at <http://www.wipo.int/pctdb/en/wo.jsp?WO=2009053829> accessed May 10, 2011).

* cited by examiner

*Primary Examiner* — Lun-Yi Lao
*Assistant Examiner* — Jarurat Suteerawongsa
(74) *Attorney, Agent, or Firm* — Perkins Coie LLP

(57) ABSTRACT

A display device that includes a housing that houses a display, and a control panel. Control panel and display are connected to a controller disposed inside of the housing. A control device can also be attached to display device. The control device is configured to resemble a welding gun. The control device is also connected to the controller. A viewer, such as welding mask viewer, is be mounted to the housing of display device.

11 Claims, 3 Drawing Sheets

DISPLAY WITH REPLICA WELDING HELMET VIEWER

This application is based upon and claims the benefit of priority from U.S. Provisional Application 60/982,223 filed on Oct. 24, 2007 in the United States Patent and Trademark Office, the disclosure of which is incorporated herein by reference in its entirety.

FIELD OF THE INVENTION

The present invention is directed to a video display, more specifically to a video display to be used to present information on welding techniques and equipment having attached thereto a replica of a welding helmet and a welding gun.

BACKGROUND OF THE INVENTION

Welding equipment and consumables are sold and rented in a variety of outlets, including well known big-box style home improvement stores, welding specialty shops and equipment rental stores. The level of knowledge available in these various types of retail establishments can vary highly from location to location. At a welding specialty store, salesmen are likely to be more knowledgeable about welding equipment and processes. These types of stores, however, are not as prevalent and not accessible to many consumers. At big-box style home improvement stores, now ubiquitous on the American landscape, salesmen are less likely to be knowledgeable out welding equipment and processes. Because of the several types of welding techniques, e.g., Metal Inert Gas (MIG), and Tungsten Inert Gas (TIG), and the different types of welding equipment, it is important that the consumer obtain proper guidance and instruction as to the appropriate type of welding equipment and consumables suitable for the consumer's needs and skill level.

In the past, consumers were required to rely on their own knowledge, the knowledge of the salesman, catalogs and/or sales collateral. The consumer's knowledge can be incorrect particularly for novice welders. Salesmen are often responsible for many types of products and do not always have detailed knowledge of the products they sell. Further, salesman can offer biased advice based on the potential commissions they might earn. Catalogs are quickly out of date and can present only a limited amount of information.

Accordingly, there is a need for an apparatus that will allow consumers to easily obtain accurate and comprehensive knowledge about welding equipment, techniques and processes.

The present invention provides such a solution.

SUMMARY OF THE INVENTION

As stated above, the present invention is directed to solve the above problems by providing an attractive, low-cost video display capable of presenting comprehensive information on welding equipment and processes to consumers.

The present invention solves this problem by providing a display system, the system comprising a housing; a display; a first control device; a controller configured to control the display based upon input from the first control device; and a viewer, the viewer having an opening, wherein the viewer is mounted on the housing with the display visible through the opening, and wherein the viewer is formed in the shape of a welding helmet Various embodiments of the present invention will be discussed below.

BRIEF DESCRIPTION OF THE DRAWINGS

The advantages, nature and various additional features of the invention will appear more fully upon consideration of the illustrative embodiments of the invention, which are schematically set forth in the figures, in which.

DETAILED DESCRIPTION OF EXEMPLARY EMBODIMENTS

The present invention relates to a display apparatus capable of being used to (1) inform consumers of the properties, characteristics, and features of specific welding equipment and supplies, (2) to teach proper welding techniques to customers, and (3) to encourage the sale of welding equipment and consumables.

The following discussion is directed to embodiments of the present invention which are related to welding applications. However, the present invention is not limited to only these applications.

Figure 1A:
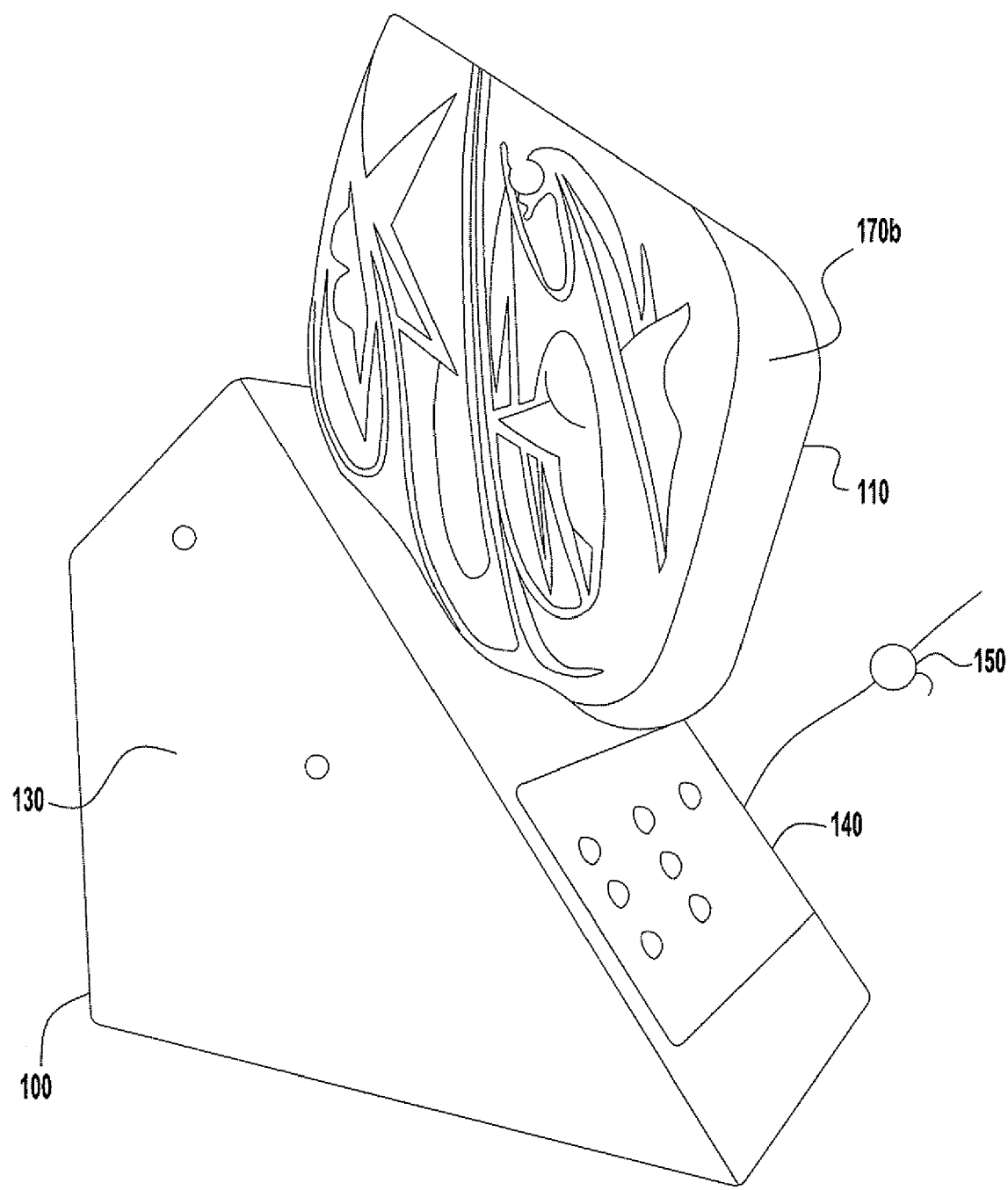
FIG. 1A is a representation of a display apparatus according to an embodiment of the present invention.
Figure 1B:
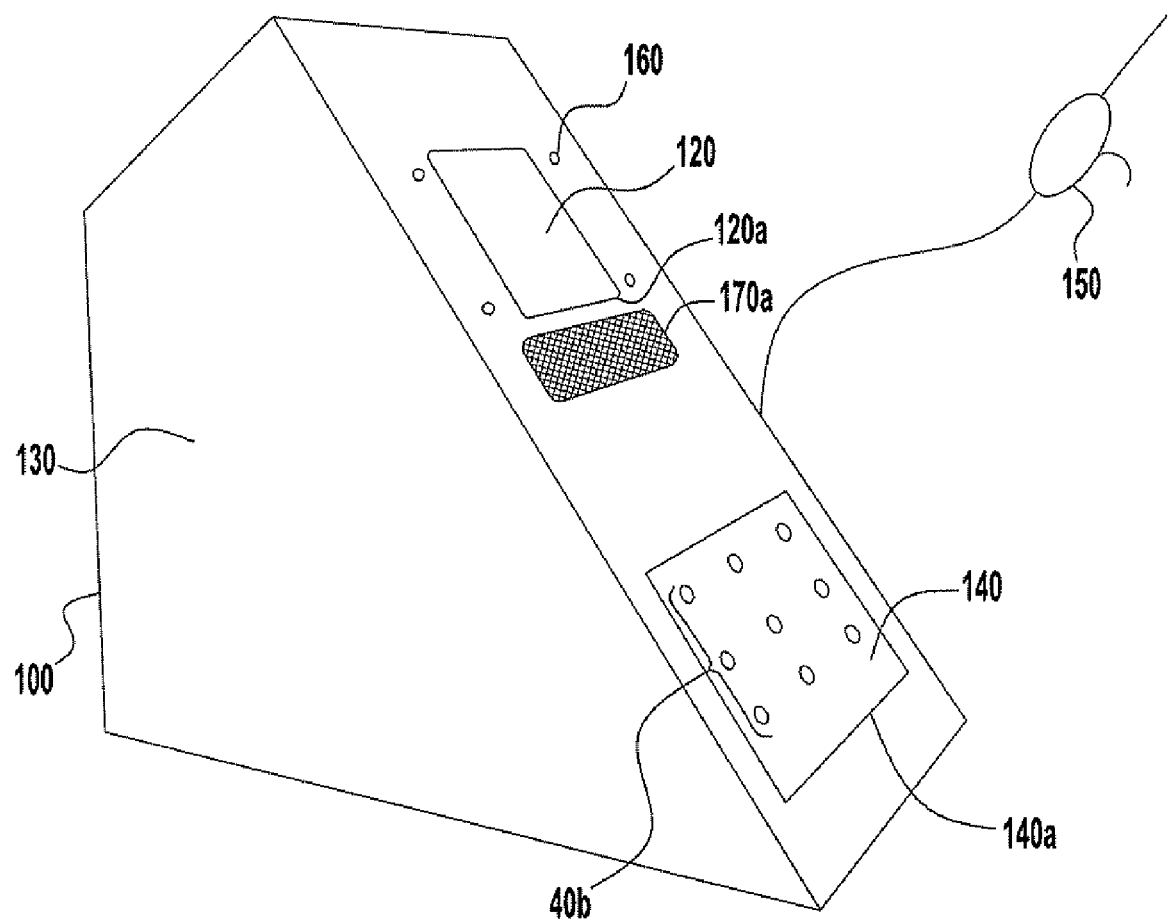
FIG. 1B is a representation of a display apparatus according to the embodiment of the present invention shown in FIG. 1A, wherein the welding helmet viewer is removed.

FIGS. 1A-B illustrate a display apparatus according to an embodiment of the present invention, wherein a welding mask viewer 110 is attached over a video display 120 of a display device 100.

In the embodiment of FIGS. 1A-B, a display device 100 is illustrated. Display device 100 includes a housing 130 housing a display 120, and a control panel 140. Control panel 140 and display 120 are connected to a controller disposed inside of the housing 130. A control device 150 can also be attached to display device 100. In this embodiment, control device 150 is configured to resemble a welding gun. Control device 150 is also connected to the controller. A viewer, such as welding mask viewer 110, may also be mounted to the housing 130 of display device 100.

Housing 130 serves as a housing for the components of display device 100, and can be made of any number of well known materials, such as wood, aluminum, steel and plastic. An opening 120a is provided in a portion of the housing 130 for the mounting of display 120. A second opening 140a is provided in another portion of housing 130 to allow for the installation of a control panel 140. Housing 130 can also include mounting means 160 for mounting the viewer 110 to the housing. Mounting means 160 can be any means capable of securely mounting viewer 110 to housing 130, e.g., adhesives, screws, bolts, hook-and-loop fasteners, nuts, etc.

Display 120 is a display capable of displaying still and moving images. Display 120 can be any number of types of well known displays, such as a liquid crystal display, a plasma display, or a cathode ray tube. Display 120 displays images to a user upon input from control panel 140 and/or control device 150.

Control panel 140 presents a variety of selection and/or control means 40b, e.g., buttons, dials, switches, knobs, keyboards, mice, touch screens, etc., to allow a user of display device 100 to select which programs to run or which images to display on display 120. When a user operates one or more of the selection and control means 40b on control panel 140, input is sent to controller.

Control device 150 allows a user to provide input to controller. Control device 150 can be any number of well known selection and/or control means. In this embodiment, control device 150 is configured to resemble a welding gun. However, control device 150 is not required to have such a configuration. In some embodiments, control device 150 could be entirely omitted from display device 100.

Speakers 170a and 170b may also be included on display device 100. In this embodiment, speakers 170a can be mounted in housing 130 and speakers 170b are mounted in viewer 110. Speakers 170a and 170b are provided to allow audio to be played to a user of display device 100. Speakers 170a and 170b are not required to be mounted on a face of housing 130 or in viewer 110, but, instead, can be mounted at any location adequate to provide a user of display device 100 with an enjoyable or realistic audio experience when using display device 100.

Control panel 140 allows a user to determine which images, video, and/or audio images to display. Control panel 140 can be as basic or as complex as desired. In one embodiment, control panel 140 might include a number of buttons or switches. A user would control the images to be displayed by pressing the button or switch captioned to the users liking. In another embodiment, control panel 140 could be comprised of a touch screen. A user would touch the screen at the appropriate location to display the appropriate image.

A controller is also included in housing 130. Controller receives input from at least one of control panel 140 and control device 150 to control the images displayed on display 120. The controller can be any number of well known electronic control devices. The controller can also include other well known electronic components, such as a memory portion for storing control logic, images, to be displayed, etc.

A peripheral input device 150 may also be attached to the controller. In one embodiment, controller is shaped like a welding gun, for example, a MIG-style welding gun. When a user selects images to display on control panel 140, in one embodiment, the images will not be displayed until the user engages a trigger on the MIG-style welding gun peripheral control device. A peripheral control device can increase the realism of the user's experience with display device 100 and ensure that images are not displayed on screen until the user is properly positioned with respect to display 120. Control device 150 can also be used to control the speed or progress of images displayed on display 120.

Peripheral device 150 can, in some embodiments, control a cursor that may be displayed on display 120. In this regard, peripheral device has functionality similar to well known computer mouse devices.

Audio speakers 170a and 170b can be included on housing 130 or on viewer 110. These audio speakers allow the user to be presented audio information either alone or in conjunction with the display of images on display 120.

In one embodiment, display device 100 is used to promote the sale of welding equipment and to educate consumers about welding products. A user interested in welding products can use the learn more about welding products and techniques. Control panel 140 can include buttons allowing the user to learn about MIG welding, TIG welding, or stick welding, to learn the appropriate techniques for welding certain materials or making welds in certain conductions. The user could also select an option that would educate the consumer about the appropriate consumable to use for certain types of welding equipment.

As a specific example, a user may select a button on control panel 140 labeled "MIG Welding Basics." After pressing this button, the user would place his head in viewer 110. Because viewer 110 is configured to resemble a welding helmet, when the user places his head in viewer 110, the user feels as if he is in a real-world welding scenario. Instructions from control panel 140 would cause display 120 and speakers 170a and 170b to display images and play sounds, respectively, corresponding to a MIG Welding Basics program stored in a memory portion of the controller. The MIG Welding Basics program may begin after a preset time after the button is pressed, or upon input from control panel 140 or control device 150.

Figure 2:
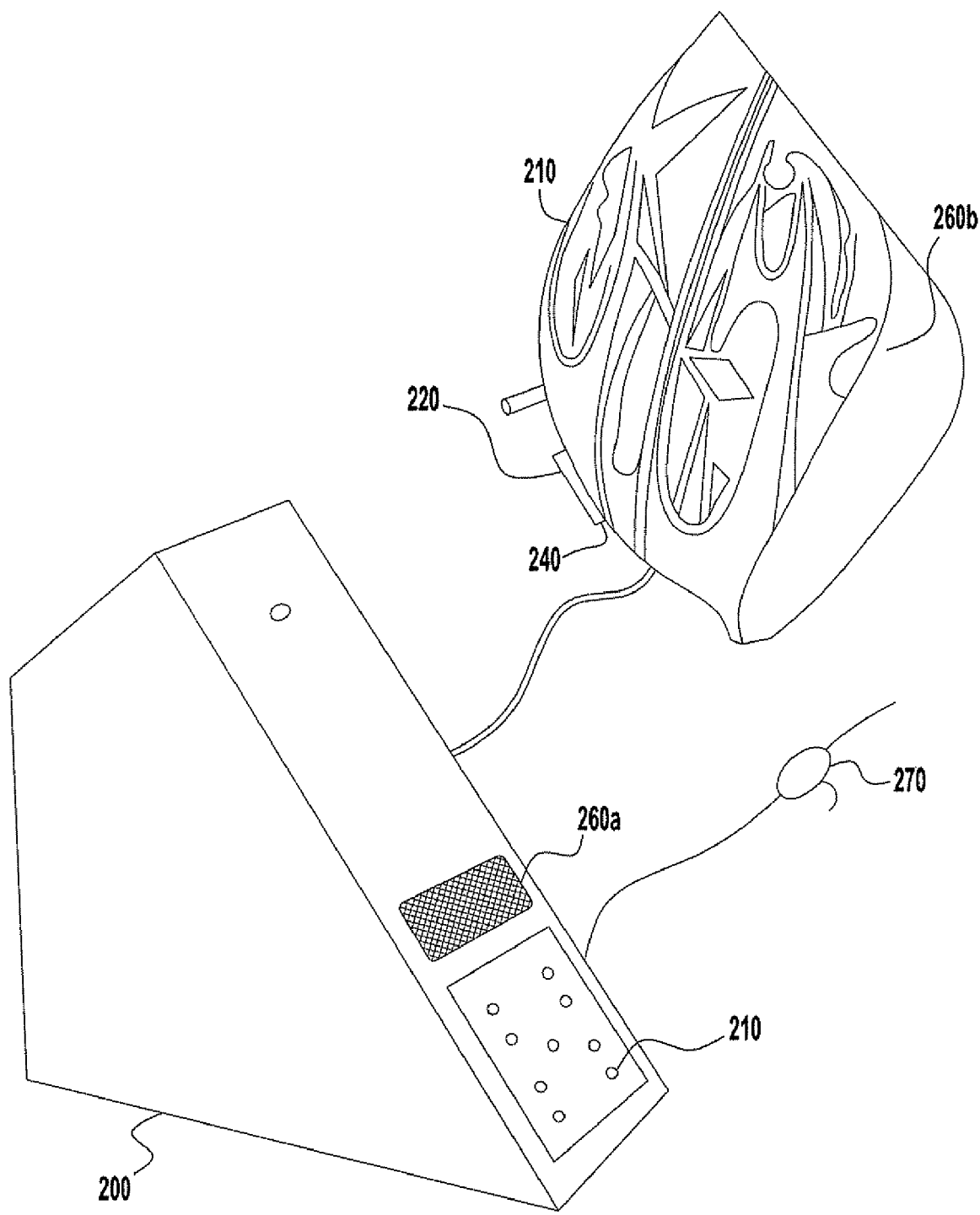
FIG. 2 is a representation of a display apparatus according to another embodiment of the present invention.

In another embodiment, illustrated in FIG. 2, the display device 200 is comprised of a display 220 configured for mounting on a welding-type helmet 210 to be viewable in an eye slot 240 of the welding-type helmet 210. Preferably, display 220 is a lightweight display that would allow welding-type helmet 210 to be worn by a user without straining the user due to the weight of display 220.

In this embodiment, rather than a user moving his head to a device, the user moves the welding-type helmet 210 with display 220 to the user's head. The user then wears the welding-type helmet 210 like a typical welding helmet. Device 200 also includes a control panel 250, a control device 270 and speakers 260a and 260b, each of which are connected to a controller. Control panel 250 and control device 270 similar to control panel 140 and control device 150, respectively, discussed above.

Of course, it is contemplated that displays devices 100 and 200 can be configured in any way such that the spirit of the invention is maintained, and the invention is not limited to the exemplary embodiment discussed above.

The present invention has been described with certain embodiments and applications. These can be combined and interchanged without departing from the scope of the invention as defined in the appended claims. The invention as defined in these appended claims are incorporated by reference herein as if part of the description of the novel features of the present invention.

I claim:

1. A display system, the system comprising:
a housing having an opening;
a display mounted within the opening of the housing such that the display is housed in the housing;
a first control device;
a controller configured to control the display based upon input from the first control device;
a viewer mounted and secured to the housing such that the display is visible through the viewer with the viewer mounted to the housing, and wherein the viewer is formed in the shape of a welding helmet; and
wherein the housing includes an inclined surface, wherein the display and the viewer are mounted on the inclined surface.

2. The system according to claim 1, the system further comprising a second control device, wherein the controller is also configured to control the display upon input from the second control device.

3. The system according to claim 2, wherein the at least one of the first control device and the second control device is configured to be in the shape of a welding gun.

4. The system according to claim 1, wherein the system further includes at least one audio speaker.

5. The system according to claim 4, wherein the at least one audio speaker is mounted on one of the housing or the viewer.

6. A display system to encourage a sale of welding equipment, the system comprising:
- a housing;
- a display mounted on the housing;
- a first control device;
- a controller configured to control the display based upon input from the first control device, the controller including a memory portion having images that promote the sale of welding equipment so as to at least one of: (i) inform of the properties, characteristics, or features of welding equipment and supplies; and (ii) teach proper welding techniques; and
- a viewer having an opening, the viewer being mounted and secured to the housing such that the display is visible through the opening of the viewer with the viewer mounted to the housing,
- wherein the viewer is formed in the shape of a welding helmet; and
- wherein the housing includes an inclined surface, wherein the display and the viewer are mounted on the inclined surface.

7. The system according to claim 6, the system further comprising a second control device, wherein the controller is also configured to control the display upon input from the second control device.

8. The system according to claim 7, wherein at least one of the first control device and the second control device is configured to be in the shape of a welding gun.

9. The system according to claim 6, wherein the system further includes at least one audio speaker.

10. The system according to claim 9, wherein the at least one audio speaker is mounted on the viewer.

11. The system according to claim 6, wherein said housing includes a viewer storage member configured to store the viewer when the viewer is not in use.

* * * * *